No. 795,192. PATENTED JULY 18, 1905.
G. W. CAMPBELL.
RIBBON ACTUATING AND SHIFT MECHANISM FOR TYPE WRITING MACHINES.
APPLICATION FILED MAR. 7, 1904.

Witnesses
Inventor
George W. Campbell
By his Attorneys
Knight Bro

No. 795,192. PATENTED JULY 18, 1905.
G. W. CAMPBELL.
RIBBON ACTUATING AND SHIFT MECHANISM FOR TYPE WRITING MACHINES.
APPLICATION FILED MAR. 7, 1904.

No. 795,192.                                                                 Patented July 18, 1905.

UNITED STATES PATENT OFFICE.

GEORGE W. CAMPBELL, OF NEW YORK, N. Y., ASSIGNOR TO THE FRANKLIN TYPEWRITER COMPANY, OF NEW YORK, N. Y., A CORPORATION OF NEW YORK.

RIBBON ACTUATING AND SHIFT MECHANISM FOR TYPE-WRITING MACHINES.

SPECIFICATION forming part of Letters Patent No. 795,192, dated July 18, 1905.

Application filed March 7, 1904. Serial No. 196,981.

*To all whom it may concern:*

Be it known that I, GEORGE W. CAMPBELL, a citizen of the United States, and a resident of the borough of Manhattan, in the city, county, and State of New York, have invented certain new and useful Improvements in Ribbon Actuating and Shift Mechanism for Type-Writing Machines, of which the following is a specification.

The object of my invention is to provide an improved ribbon actuating and shift mechanism for that class of type-writing machines called the "Franklin," as fully hereinafter set forth and described in the following specification and clearly shown in the accompanying drawings, in which like reference-numerals refer to like parts, and in which—

Figures 2, 18:
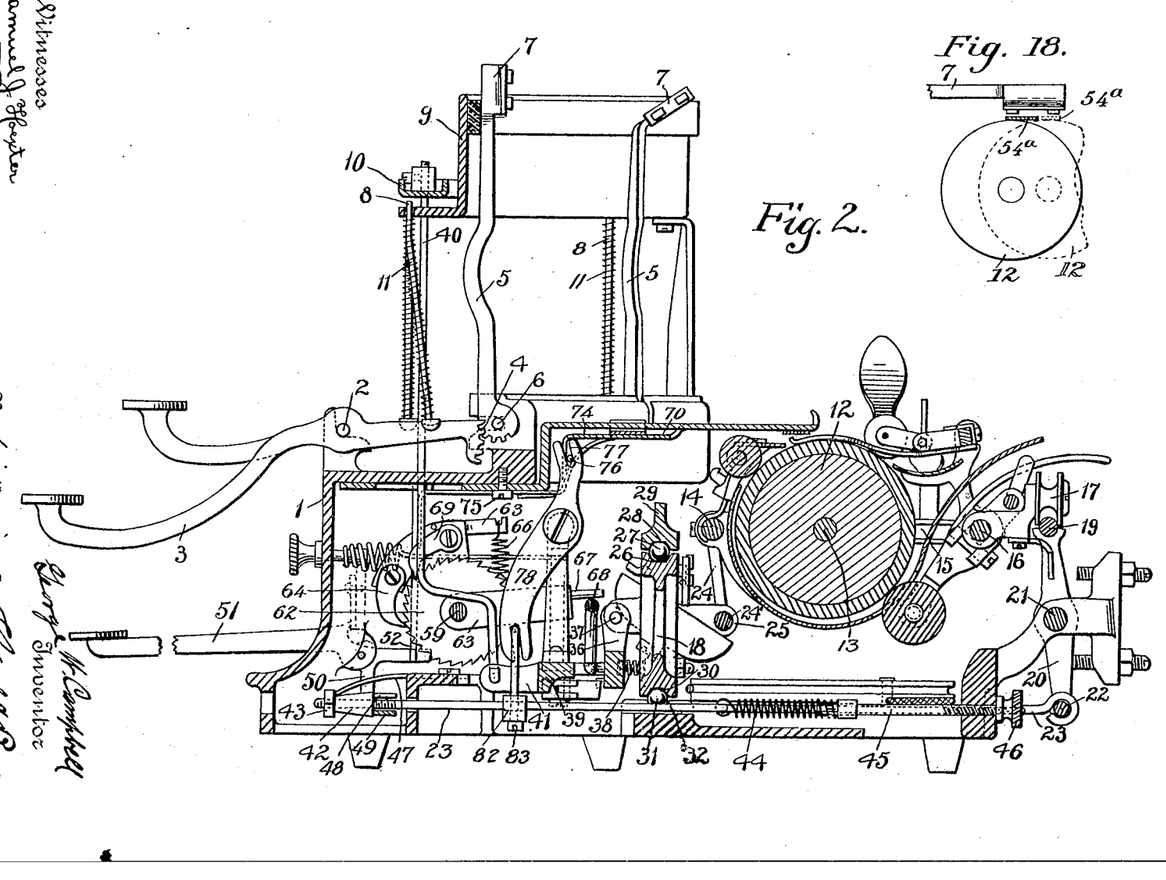
Fig. 2 is a transverse section through the machine with parts removed for the sake of clearness, showing a side view of the carriage-shift, the ribbon-feed, and ribbon-shift mechanism with the type-bar at rest.
Fig. 18 is a detail side elevational view showing the relative positions of the platen, the ribbon and the type-bar in the two-case printing positions, the position of the ribbon and the platen in the capital-case being shown in dotted lines.
Figure 3:
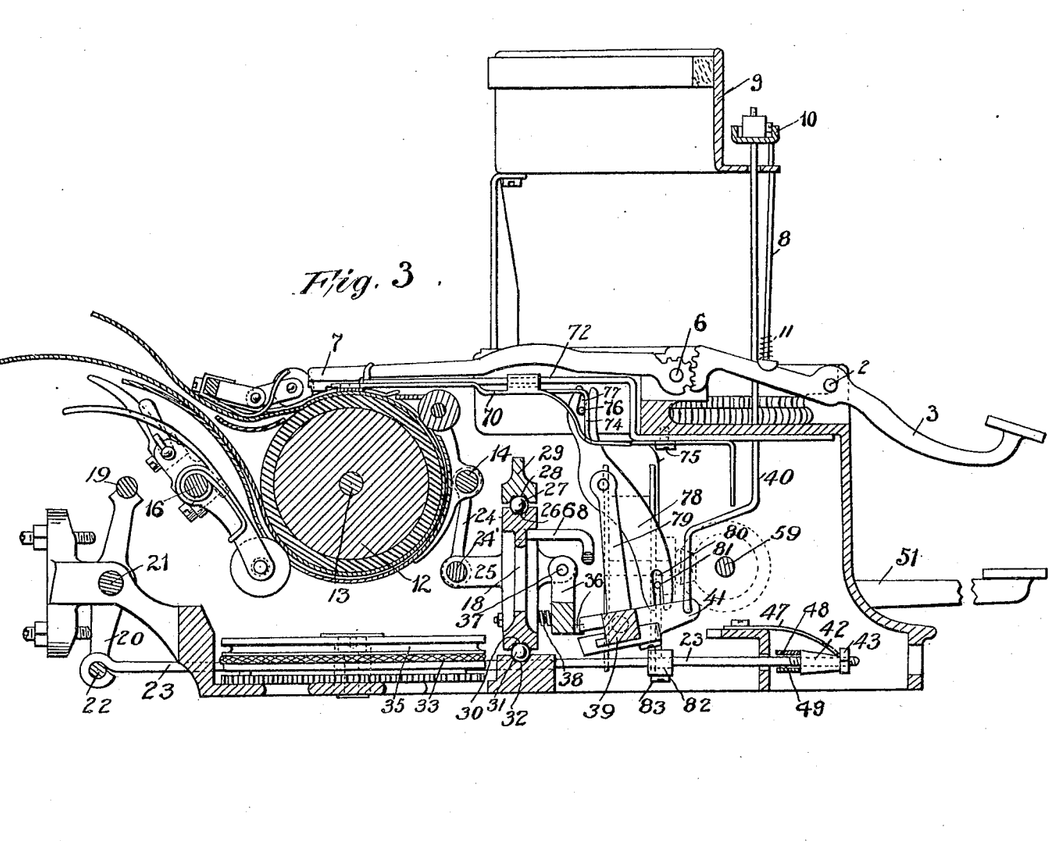
Fig. 3 is a similar view looking in the opposite direction, showing the position of the parts, the ribbon-feed mechanism being removed when the type-bar is in its printing position.

Referring now in detail to the drawings, 1 represents the base of the machine, having mounted thereon on a series of supports or pivots 2, a series of type-keys 3, geared at 4 to the type-bars 5, pivoted at 6 to the base of the machine. Type-bars 5 carry type 7 at their upper ends, Fig. 2. Upon the rear arms of the keys 3 are mounted rods 8, extending up through a stationary portion or bar 9, mounted above the machine-base 1 in position to engage a vertically-movable segmental universal bar 10. Key-bars 3 are returned to their normal position by springs 11, mounted on the rods 8.

The platen 12 is mounted upon a central bar 13, mounted upon the platen-frame, comprising the end bars 15 and front and rear longitudinal bars 14 and 16, respectively. Upon the platen-frame is mounted the customary paper-guide devices, the platen-spacing mechanism and other attachments common to type-writing machines, which need not be specifically described herein, Fig. 2.

The platen-carriage comprises the rollers 17 and the traveling track-frame 18. The rollers 17 are mounted on rear bar 16 and travel upon a shift track-bar 19, mounted upon a pivoted shift-frame 20, the sides of the said frame 20 being connected by a pivot-bar 21 and a bar 22 at the lower end of the said sides, to which the shift connecting-rod 23, hereinafter described, is connected at its rear end. At its forward end the platen-frame is mounted upon swinging links 24, pivotally mounted on a bar 24', carried by lugs 25 on the track-frame 18. Track-frame 18 is provided with a groove 26 in the upper end thereof, in which travels a ball-bearing 27, which travels also in a groove 28 in the depending bar 29, suitably mounted upon the base of the machine. Track-frame 18 also has a groove 30 in its lower bar, which receives a ball-bearing 31, traveling in a groove 32 in the base of the machine, Fig. 2.

Figure 1:
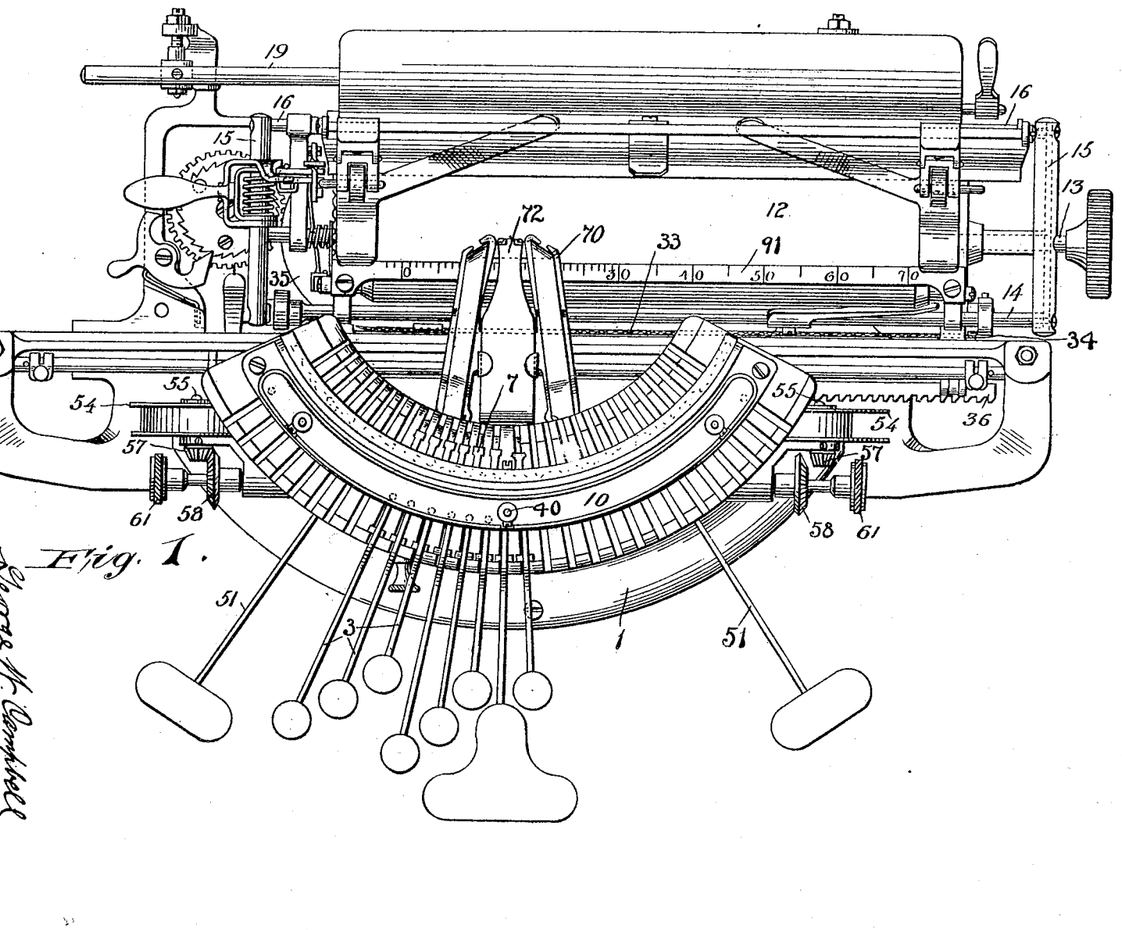
Figure 1 is a top plan view of a Franklin type-writer embodying my improved structure.

In Fig. 1 I have shown the customary carriage-chain 33, secured at 31 to the track-frame 18 and wound about the customary spring-drum 35, mounted upon the machine-base. It will of course be obvious that the track-bar 18 will be drawn from right to left across the machine by the chain 33 and that the platen-frame, through its connections with the said track-frame 18, will be carried therewith.

Any well-known mechanism may be used in connection with the improvements herein described for producing the desired step-by-step feed of the carriage. In the present case I have shown the following mechanism: a rack-bar 36, pivoted at 37 to lugs or projections on the track-frame 18 and held normally in engagement with the escapement-dogs by a coil-spring 38, mounted on a pin or projection on the track-frame 18. A suitable hand-lever for rocking the rack-bar 36 out of engagement with the escapement-dogs may be employed, although this is not shown in the drawings. The escapement-dogs are mounted upon a rock-shaft 39, suitably trunnioned in the machine-base, and said dogs may be of any suitable structure. As shown in the drawings, they consist in the immovable or space dog and the movable or trip dog. Said dogs are actuated to produce the step-by-step feed of the carriage in the manner customary in the Franklin type-writer—that is, through a rod 40, connected at its upper end to the universal bar 10 and at its lower end to an arm or projection 41 on the said rock-arm 39.

Figures 4, 9, 10:
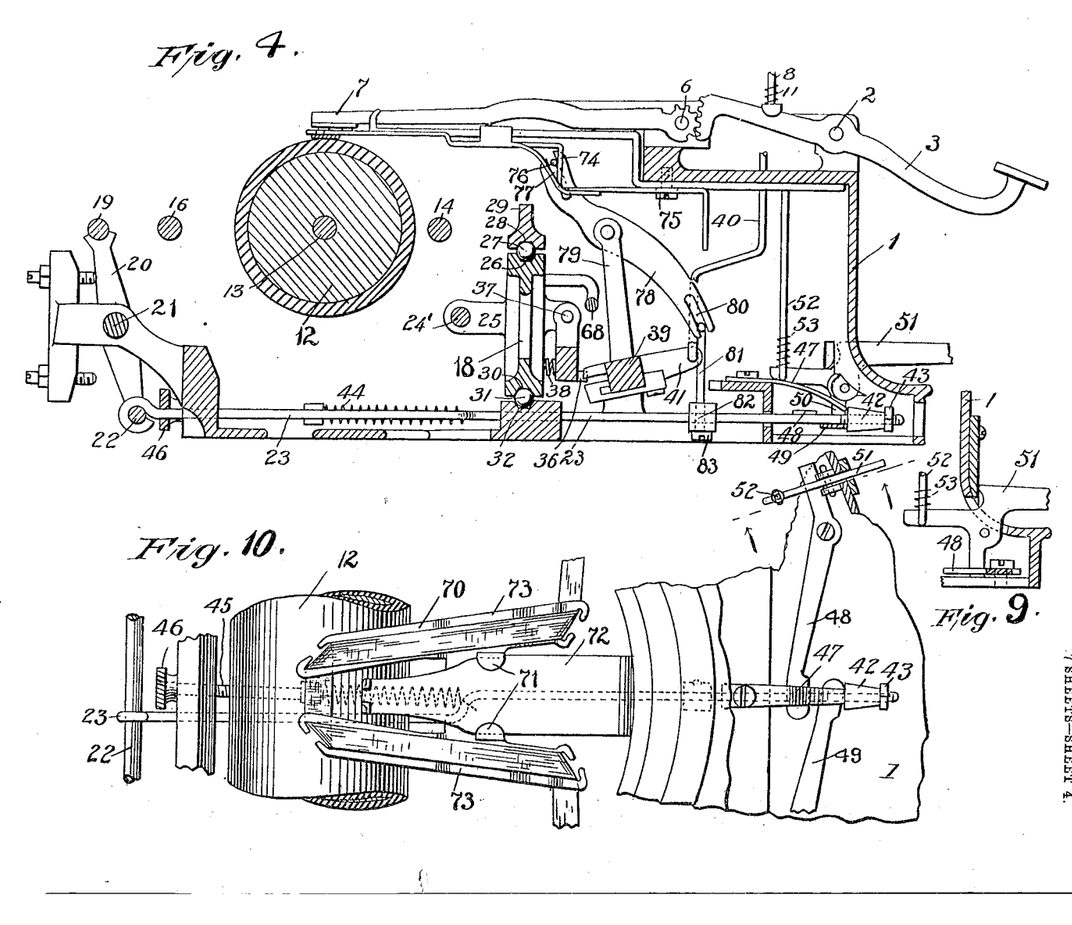
Fig. 4 is a similar view showing the position of the parts when the carriage has been shifted and the type-bar is in its printing position.
Fig. 9 is a detail side elevation of a portion of one of the carriage-shift keys, showing the finger of the same in engagement with one of the pivoted horizontal shift-levers.
Fig. 10 is a detail top plan view of one form of ribbon-frisket, showing also the shift-levers and shift connecting-rod and one of the carriage-shift keys.

The shift connecting-rod 23 is of a construction customary in the Franklin type-writer and extends from the front of the machine to the bar 22 on the pivoted shift-frame 20. At its forward end the shift connecting-rod 23 has mounted thereon the conical block 42, adjustably secured on the said rod by a set-nut 43 engaging screw-threads on the forward end of the rod 23. The conical block 42 is arranged with its apex toward the front of the machine and the base of the cone toward the rear of the machine. Connecting-rod 23 has secured thereto intermediate its ends a coil-spring 44, secured at its other end to the set-pin 45, which may be adjusted by a set-nut 46 for the purpose of adjusting the tension of the spring 44. Mounted on the base of the machine in juxtaposition to the conical block 42 is a band-spring 47, engaging at its free end the conical surface of block 42 for purposes hereinafter described. Pivotally mounted on the base of the machine, as shown in Fig. 10, are a pair of shift-levers 48 49. The lever 48 engages at one end the base of the conical block 42 beneath the connecting-rod 23, and the lever 49 engages the base of the said block 42 above the connecting-rod 23, for purposes hereinafter described. The short arms of the levers 48 49 are each engaged by downwardly-projecting fingers or projections 50 on pivoted shift-keys 51. Shift-keys 51 have mounted on their inner ends vertical rods 52, having spiral springs 53 thereon, which bear against a portion of the machine base or frame and act to return the levers 51 to their normal position. A depression of either one of the shift-keys 51 will force its respective pivoted shift-lever 48 or 49 against the base of the conical block 42, drawing the shift connecting-rod 23 toward the front of the machine in opposition to the spring 44 until the band-spring 47 slides over the rear end of the block 42 and engages the base of the said block. From the structure described it will readily be seen that upon actuation of the lever 49 the spring 47 will be held from engagement with the base portion of the block 42, but said spring will be allowed to drop into engagement with the base of the said block upon actuation of the lever 48. The object of the spring 47 is to lock the shift connecting-rod 23 in its forward position, so that the carriage will be held in its shifted position. If the lever 48 be actuated, the spring 47 will drop into engagement with the base of the block 42, holding the said block forward, and thereby locking the carriage into shifted position. When it is desired to release the carriage from its shifted position, the lever 49 will be actuated, and upon actuation of said lever 49 the spring 47 will be raised sufficiently to allow the block 42 to slide under the same upon release of the said lever. Actuation of the mechanism hereinbefore described will be readily understood by one familiar with the construction of the Franklin type-writer.

Figures 5, 6, 7, 8:
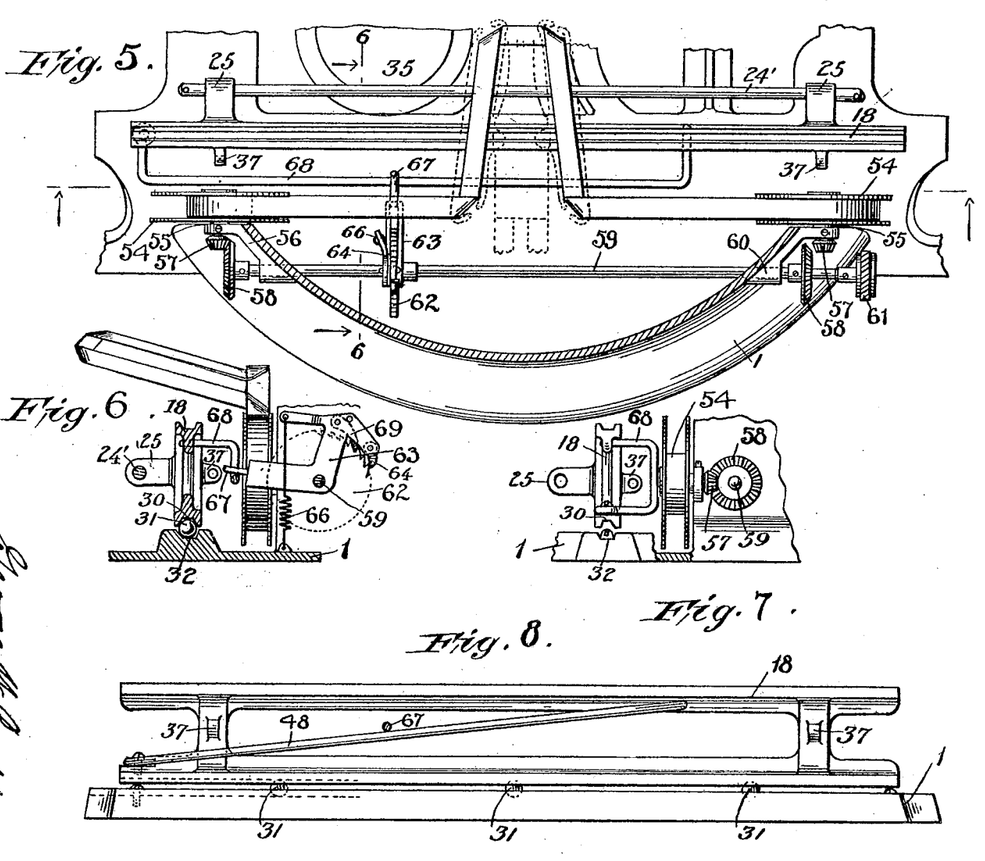
Fig. 5 is a top plan view of the ribbon-feed mechanism, showing a portion of the machine-base and platen-carriage.
Fig. 6 is a transverse section through the same on the line 6 6, Fig. 5.
Fig. 7 is an end view of the mechanism shown in Fig. 5.
Fig. 8 is a detail front elevation of the carriage track-frame and the inclined rod carried by the said frame, and one of the tracks upon which the said frame travels.

All structure hereinbefore described does not form a part of my present invention, inasmuch as the same is either well known in the art or forms part of separate applications for patent. My present invention relates more particularly to the ribbon actuating and shift mechanism. Referring now to said mechanism, 54 represents the ribbon-spools mounted one at each side of the machine upon shafts 55, mounted in eye lugs or projections 56 on the machine-base 1. Shafts 55 carry at their forward ends bevel-gears 57, which mesh with bevel-gears 58 on a transversely-extending shaft 59, mounted in suitable bearings 60 on the base 1 of the machine. Shaft 59 is mounted to move longitudinally as well as rotatably to shift first one and then the other of the gears 58 into engagement with its respective gear 57. At either or both ends of the shaft 59 is mounted a hand wheel or wheels 61 for the purpose of adjusting the said gears 58 into or out of engagement with their respective gears 57 by hand, Fig. 5.

The ribbon is mounted upon the spools 54 and extends toward the center of the machine and then upwardly and toward the rear of the machine to the frisket. Rotation of the shaft 59 will wind the ribbon to either one spool or the other, depending upon which of the respective gears 57 58 are in engagement. For the purpose of rotating the shaft 59 to feed the ribbon I have provided a pawl-and-ratchet mechanism comprising a ratchet-wheel 62, mounted upon the shaft 59 to rotate therewith, and a forked bell-crank lever 63, mounted on the said shaft 59 to move independently thereof and straddling the ratchet-wheel 62, the bell-crank lever 63 carrying a pivoted pawl 64 at its upper end in engagement with the teeth of the ratchet-wheel 62. Bell-crank 63 is provided with an extension or projection 65 at its upper end, to which is secured a coil-spring 66, secured at its other end to the machine-base 1 and tending to hold the lower arm of the bell-crank 63 in its lowered position. The lower arm of the bell-crank 63 carries a pin or projection 67, which travels upon an inclined rod 68, seated in the track-frame 18. As the track-frame 18 travels from right to left of the machine-base the pin 67 on the bell-crank 63 travels up the inclined rod 68, tilting the bell-crank 63 forward to feed the ribbon in either direction, depending upon which of the gears 57 58 are in engagement, as clearly shown in Fig. 6.

In order to insure the feed of the ribbon where column-work is being performed on the machine and where the carriage is moved back and forth a very slight distance, or a distance insufficient to move the pawl 64 on its forward movement to an extent equal to the length of one tooth on the ratchet-wheel 62, a duplicate pawl 69 is provided mounted on the bell-crank 63 in juxtaposition to the pawl 64 and in such a position that but one of said pawls at one time will be in engagement with the apex of an interdental. Therefore but one of said pawls at the time will be in operative engagement with the teeth of the ratchet-wheel 62. The provision of the two pawls 64 and 69 therefore insures the operative connection between the bell-crank 63 and ratchet 62 at all times, so that however slight be the forward movement of the carriage the ratchet-wheel 62 will be fed forward. When the ribbon has been completely wound on one spool or the other, the shaft 59 is shifted longitudinally by hand-wheel 61 to bring the respective gears 57 58 into engagement. As stated before, the ribbon passes from the spools toward the center of the machine and then upwardly and rearwardly through the frisket 70, which is mounted through lugs or projections 71 to slide on the alining-plate 72.

The frisket 70 is provided with a pair of elongated wings or extensions 73, with notches at each end to receive the ribbon which passes over the said wings and across from one wing to the other at their platen ends. The shank or central portion 74 of the frisket is suitably bent to conform to the shape of the machine base or frame and is slidably secured at its end by a screw 75 passing through a slot in the said shank. The head of the screw 75 serves to maintain the frisket 70 in a horizontal position. The shank 74 of the frisket 70 carries a horizontal pin 76, which is engaged by a notch 77 in the adjustable lever 78, pivotally mounted upon a standard 79 on the escapement rock-shaft 39. At its lower end the lever 78 is provided with a notch 80, which is engaged by a bent bar 81, adjustably mounted through means of a block 82 and screw 83 upon the shift connecting-rod 23.

The oscillation of the rock-shaft 39 will throw the standard 79 forward, carrying with it the lever 78 and thrusting forward the frisket through means of the notch 77 and pin 76 to carry the ribbon to the printing-point over the platen. When the carriage is shifted through depression of one of the levers 51 and the shift connecting-bar 23 is brought forward in the manner described, the angle of the lever 78 is changed or adjusted through means of the bent rod 81 and the notch 80, which will have the effect of thrusting forward the frisket 70 to an advanced initial position. This is caused through the sliding connection between the frisket and the lever 78, which upon elevation of the lower end of its arm forces the pin 76 forward. It will be readily seen that upon the next oscillation of the rock-shaft 39 in the manner already described the arm 78 being mounted upon the standard 79 will be forced forward, carrying the frisket 70 still farther forward to an advanced printing position.

In the practical use of my invention the parts are so adjusted that upon shifting the case the frisket 70 moves a distance less than the movement of the platen. This is attributable to the fact that the bars 22 19 on the shift-frame 20 are equidistant from the pivot-bar 21, whereas the horizontal pin 76 and the bent rod 81 at no time engage the lever 78 at points equidistant from the pivot of said lever. It will be seen that the two arms of the lever 78 are of unequal length. The effect of this construction is that the full movement of the shift connecting-rod 23 is communicated to the track-bar 19, while something less than the full movement of said shift connecting-rod 23 is communicated to the horizontal pin 76 upon actuation of the shift-key. Further, the frisket 70 is thrust forward to the upper-case or advanced initial position a distance less than the distance to which the platen is shifted, so that the type on the type-bars will not strike the ribbon 54ᵃ in the same place when writing is being done in the capital case as they do when the parts are in their lower-case positions. The advantage of this arrangement is that a greater area of the ribbon is utilized, Fig. 18. As shown in said figure, the capital type at the end of the type-bar strike nearest one edge of the ribbon 54ᵃ, while the small type strike nearest the opposite edge of the ribbon.

Figures 15, 16, 17:
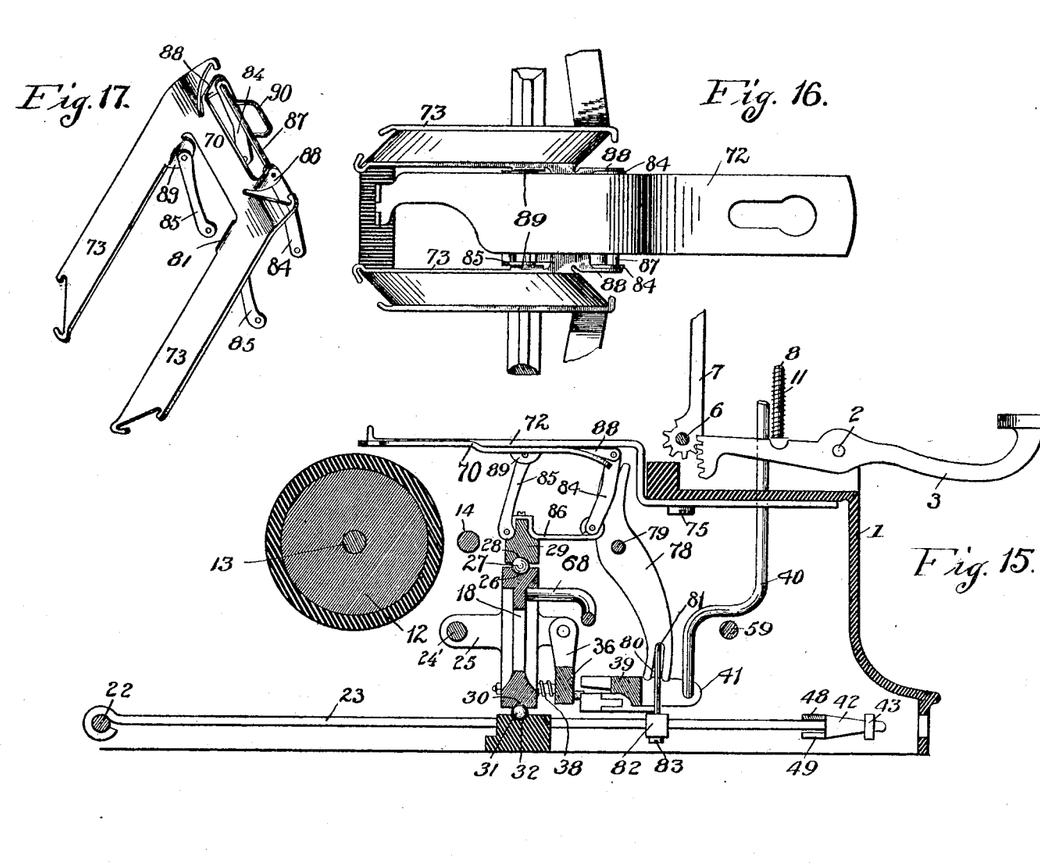
Fig. 15 is a transverse section through a portion of the machine, showing a modified form of mounting for the ribbon-frisket and its connections with the ribbon movement and shift mechanism.
Fig. 16 is a detail top plan view of the frisket shown in Fig. 15 and the juxtaposed alining-plate.
Fig. 17 is a detail perspective view of the modified frisket shown in Figs. 15 and 16.

In Figs. 15, 16, and 17 I have shown slight modifications in the mounting of the frisket. As shown therein, I mount the frisket upon links 84 and 85, the said links being pivotally mounted upon pins carried by the frisket 86, suitably mounted on the machine-frame. Links 84 are pivotally connected to a pin 87, mounted in lugs 88 in the frisket. The links 85 are pivotally connected at their upper ends to lugs 89 on the said frisket. Pin 87 is provided with an extension 90, which engages the notch 77 in the arm 78. Such a mounting for the frisket 70 removes all friction between the alining-plate 72 and the frisket 70.

Figure 11:
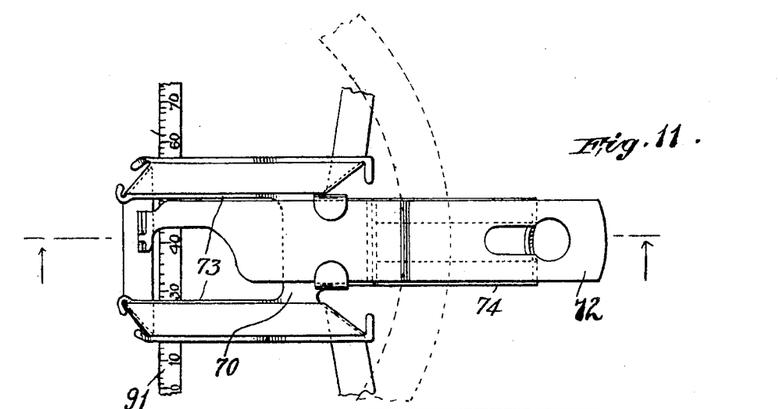
Fig. 11 is a similar view of a slightly-modified form of ribbon-frisket, showing also a modification in the alining-plate upon which said frisket is mounted to slide and a portion of the scale-bar thereunder.
Figure 12:
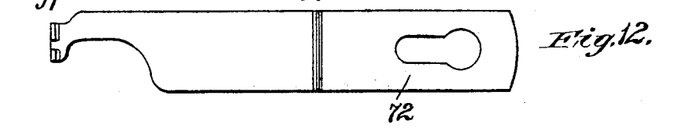
Fig. 12 is a similar view of the alining-plate detached.
Figure 13:
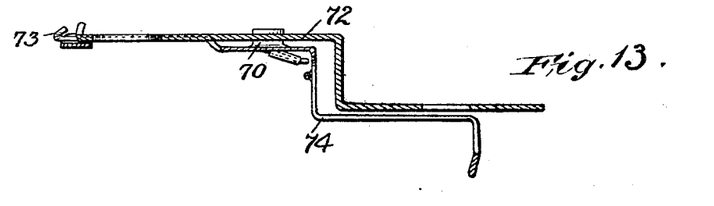
Fig. 13 is a longitudinal section through the structure shown in Fig. 11 with the scale-bar removed.
Figure 14:
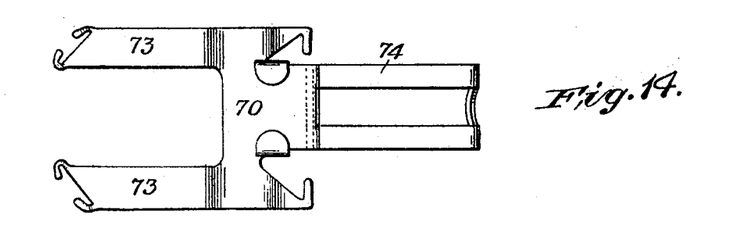
Fig. 14 is a detail top plan view of the ribbon-frisket shown in Fig. 11 detached from the alining-plate.

As clearly shown in Figs. 11 and 12, I have shown slight modifications in the alining-plate 72. Therein a portion of the alining end of said plate 72 is cut away for the purpose of subjecting a greater portion of the scale-bar 91 to the view of the operator.

I do not wish to be limited to the exact details of structure herein shown and described, inasmuch as the same may be varied without departing from the spirit of my invention.

Having thus described my invention, the following is what I claim as new therein and desire to secure by Letters Patent:

1. In a writing-machine, the combination with the ribbon-spool, of the rotatable shaft geared thereto, the ratchet-wheel rigidly mounted on said shaft, a forked bell-crank lever straddling said ratchet-wheel, pawls so mounted on said lever as to insure the operative engagement of one of said pawls at all times with the teeth of the ratchet-wheel, and an inclined rod mounted to move with the carriage and engaging said bell-crank lever to actuate the same.

2. In a writing-machine, the combination with the ribbon-spools mounted at either side of the machine and provided with suitable gears, of the rotatable shaft movable into gear with either one of said spools, the ratchet-wheel rigidly mounted on said shaft, forked bell-crank lever mounted on said shaft to move independently of said ratchet-wheel and having a projection, pawls so mounted on said bell-crank lever as to insure the operative engagement at all times of one of said pawls with the teeth of said ratchet-wheel, and an inclined bar mounted to travel with the machine-carriage, and in engagement with the projection on said bell-crank.

3. In a type-writing machine, the combination with the machine-frame and a carriage mounted to travel thereon, of ribbon-spools mounted on the machine-frame, gears on said ribbon-spools, a shaft journaled in said machine-frame, gears carried by said shaft, hand means on said shaft for moving its gears alternately into engagement with the gears on the ribbon-spools, a ratchet-wheel mounted to rotate said shaft, a bell-crank lever mounted on and movable independently of said shaft, a pawl carried by said bell-crank lever in engagement with the teeth of said ratchet-wheel, and an inclined way on the carriage engaging said bell-crank lever to elevate the same during the travel of the carriage to rotate said ratchet-wheel.

4. In a type-writing machine, the combination with the machine-frame and a carriage mounted to travel thereon, of ribbon-spools mounted on the machine-frame, gears on said ribbon-spools, a shaft journaled in said machine-frame, gears carried by said shaft, hand means on said shaft for moving its gears alternately into engagement with the gears on the ribbon-spools, a ratchet-wheel mounted to rotate said shaft, a spring-controlled bell-crank lever mounted on and movable independently of said shaft, a pawl carried by said bell-crank lever in engagement with the teeth of said ratchet-wheel, and an inclined way on the carriage engaging said bell-crank lever to elevate the same during the travel of the carriage to rotate said ratchet-wheel.

5. In a writing-machine, the combination with the ribbon-spools mounted at either side of the machine and provided with suitable gears, of the rotatable shaft movable into gear with either one of said spools, the ratchet-wheel rigidly mounted on said shaft, a forked bell-crank lever mounted on said shaft to move independently of the said ratchet-wheel and having a suitable projection, the pawls carried by the said bell-crank lever and adapted one at a time to operatively engage the teeth of the said ratchet-wheel, and the inclined bar mounted to travel with the machine-carriage and in engagement with the projection on the said bell-crank.

6. In a type-writing machine, the combination with the ribbon-frisket, the escapement rock-arm and the carriage-shift mechanism, of a frisket-actuating arm pivotally mounted on said escapement rock-arm and engaging said frisket, and means mounted on the carriage-shift mechanism also engaging the said frisket-actuating arm to change the angle of said arm to regulate the degree of thrust of said frisket.

7. In a type-writing machine, the combination with the frisket, the escapement rock-arm and the carriage-shift mechanism, of a standard mounted on said rock-arm, an arm slotted at its ends pivoted to said standard, a suitable projection on the frisket engaging one of the slotted ends of said arm, and a projection on the carriage-shift mechanism engaging the other slotted end of said arm.

8. In a type-writing machine, the combination with the frisket, the escapement rock-arm and a carriage-shift bar, of a standard mounted on said rock-arm, a frisket-actuating arm engaging said frisket, and a projection on said carriage-shift bar engaging said frisket-actuating arm adapted to change the angle of said actuating-arm upon movement of said bar to regulate the degree of thrust of said frisket.

GEORGE W. CAMPBELL.

Witnesses:
FRED VOGT,
SUSAN E. CARINE.